United States Patent
Winans et al.

(10) Patent No.: US 11,054,014 B2
(45) Date of Patent: *Jul. 6, 2021

(54) CHAIN RING WITH TEETH OPPOSITELY LATERALLY ENGAGING A DRIVE CHAIN

(71) Applicant: Eko Sport, Inc., Grand Junction, CO (US)

(72) Inventors: Scott Winans, Grand Junction, CO (US); Darek C. Barefoot, Grand Junction, CO (US); Timothy A. Fry, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/567,716

(22) Filed: Sep. 11, 2019

(65) Prior Publication Data

US 2020/0003293 A1 Jan. 2, 2020

Related U.S. Application Data

(63) Continuation of application No. 15/094,389, filed on Apr. 8, 2016, now Pat. No. 10,451,166.

(60) Provisional application No. 62/146,635, filed on Apr. 13, 2015.

(51) Int. Cl.
*F16H 55/30* (2006.01)
*B62M 9/00* (2006.01)
*F16G 13/06* (2006.01)

(52) U.S. Cl.
CPC .............. *F16H 55/303* (2013.01); *B62M 9/00* (2013.01); *F16G 13/06* (2013.01)

(58) Field of Classification Search
CPC ........ F16H 55/30; F16H 55/303; B62M 9/00; F16G 13/06
See application file for complete search history.

(56) References Cited

U.S. PATENT DOCUMENTS

| | | | |
|---|---|---|---|
| 2,574,450 | A | 5/1882 | Lechner |
| 1,482,896 | A | 2/1924 | Huntington et al. |
| 1,583,221 | A | 5/1926 | Carlson |
| 1,835,406 | A | 12/1931 | Kirsten |
| 2,602,343 | A | 7/1952 | Barrett et al. |

(Continued)

FOREIGN PATENT DOCUMENTS

| | | |
|---|---|---|
| DE | 2816137 A1 | 10/1979 |
| DE | 102013009492 A1 | 12/2014 |

(Continued)

*Primary Examiner* — Michael R Mansen
*Assistant Examiner* — Mark K Buse
(74) *Attorney, Agent, or Firm* — Jason H. Foster; Kremblas & Foster

(57) ABSTRACT

A drive system for a vehicle includes a chain ring and a drive chain. The chain ring has a plurality of teeth serially arranged and joined to one another. A first subset of teeth has a first outer face that applies a lateral pressure to a link of a drive chain in a first direction. A second subset of teeth has a second outer face that applies a lateral pressure to another link of a drive chain in a second direction. The teeth all have substantially the same width. The top surfaces of the teeth are offset from the centerline of the drive chain. The centerlines of the top surfaces of the teeth are arranged asymmetrically on one side of the centerline of the drive chain.

25 Claims, 8 Drawing Sheets

(56) References Cited

U.S. PATENT DOCUMENTS

| | | |
|---|---|---|
| 3,167,175 A | 1/1965 | Kools |
| 3,498,148 A | 3/1970 | Gerbasi et al. |
| 3,956,943 A | 5/1976 | Yamasaki |
| 3,969,947 A | 7/1976 | Martin et al. |
| 4,144,773 A | 3/1979 | Addicks |
| 4,174,642 A | 11/1979 | Martin et al. |
| 4,181,033 A | 1/1980 | Nagano |
| 4,201,120 A | 5/1980 | Segawa |
| 4,240,303 A | 12/1980 | Mosley |
| 4,261,214 A | 4/1981 | Watanabe et al. |
| 4,268,259 A | 5/1981 | Segawa et al. |
| 4,330,286 A | 5/1982 | Nagano |
| 4,384,865 A | 5/1983 | Ueno |
| 4,559,028 A | 12/1985 | Reeves, Jr. |
| 4,576,587 A | 3/1986 | Nagano |
| 4,727,636 A | 3/1988 | Nagano |
| 4,955,840 A | 9/1990 | Moomaw |
| 5,066,264 A | 11/1991 | Romano |
| 5,192,250 A | 3/1993 | Kobayaski |
| 5,285,701 A | 2/1994 | Parachinni |
| 5,368,130 A | 11/1994 | Wilke et al. |
| 5,503,598 A | 4/1996 | Neuer et al. |
| 5,545,096 A | 8/1996 | Su |
| 5,869,910 A | 2/1999 | Colens |
| 5,906,490 A | 5/1999 | Kramer Primus et al. |
| 5,912,700 A | 6/1999 | Honey et al. |
| 5,935,033 A | 8/1999 | Tseng et al. |
| 6,013,001 A | 1/2000 | Miyoshi |
| 6,195,370 B1 | 2/2001 | Haneda et al. |
| 6,203,462 B1 * | 3/2001 | Takamori ............... B62M 9/02 474/156 |
| 6,325,734 B1 | 12/2001 | Young |
| 6,340,338 B1 | 1/2002 | Kamada |
| 6,415,532 B1 | 7/2002 | Bricko et al. |
| 6,500,084 B2 | 12/2002 | Wigsten |
| 6,761,657 B2 | 7/2004 | Young |
| 7,416,500 B2 | 8/2008 | Young et al. |
| 7,462,120 B1 | 12/2008 | Thompson |
| 7,491,143 B2 | 2/2009 | Valle |
| 7,686,721 B2 | 3/2010 | Tabe et al. |
| 7,824,287 B2 | 11/2010 | Nonoshita et al. |
| D715,699 S | 10/2014 | Reiter et al. |
| D716,191 S | 10/2014 | Reiter |
| 8,882,619 B2 | 11/2014 | Braedt |
| 8,888,631 B2 | 11/2014 | Morita |
| 9,062,758 B2 | 6/2015 | Reiter |
| 9,086,138 B1 | 7/2015 | Emura |
| 9,182,027 B2 | 11/2015 | Reiter et al. |
| 9,291,250 B2 | 3/2016 | Reiter et al. |
| 9,334,014 B2 | 5/2016 | Fukunaga |
| 9,394,986 B2 | 7/2016 | Pfeiffer |
| 9,394,987 B2 | 7/2016 | Pfeiffer |
| 9,404,565 B2 | 8/2016 | Pfeiffer |
| 9,440,706 B2 | 9/2016 | Iwai et al. |
| 9,457,870 B2 | 10/2016 | Sugimoto |
| 9,463,844 B2 | 10/2016 | Fukunaga |
| 9,493,211 B2 | 11/2016 | Reiter et al. |
| 9,873,481 B2 | 1/2018 | Braedt |
| 10,451,166 B2 * | 10/2019 | Winans ................ B62M 9/00 |
| 2002/0098934 A1 | 7/2002 | Wigsten |
| 2005/0090349 A1 | 4/2005 | Lee |
| 2006/0172840 A1 | 8/2006 | Kamada |
| 2006/0252592 A1 * | 11/2006 | Young ...................... F16H 7/06 474/161 |
| 2006/0258498 A1 | 11/2006 | Tabe et al. |
| 2007/0054768 A1 | 3/2007 | Miyazawa |
| 2007/0060428 A1 | 3/2007 | Meggiolan |
| 2009/0069135 A1 | 3/2009 | Chiang |
| 2011/0092327 A1 | 4/2011 | Oishi |
| 2012/0172165 A1 | 7/2012 | Schroedl |
| 2013/0072334 A1 | 3/2013 | Braedt |
| 2013/0109519 A1 | 5/2013 | Morita |
| 2013/0139642 A1 | 6/2013 | Reiter et al. |
| 2013/0184110 A1 * | 7/2013 | Reiter .................. F16H 55/30 474/152 |
| 2013/0345006 A1 | 12/2013 | Yang |
| 2014/0100069 A1 | 4/2014 | Reiter et al. |
| 2014/0338494 A1 * | 11/2014 | Sugimoto ............. F16H 55/30 74/594.2 |
| 2014/0364259 A1 * | 12/2014 | Reiter ................... B62M 9/10 474/155 |
| 2015/0198231 A1 | 7/2015 | Emura |
| 2015/0217834 A1 | 8/2015 | Iwai et al. |
| 2015/0226306 A1 | 8/2015 | Pfeiffer |
| 2015/0226308 A1 | 8/2015 | Pfeiffer |
| 2015/0285362 A1 | 10/2015 | Pfeiffer |
| 2015/0285363 A1 | 10/2015 | Pfeiffer |
| 2015/0307156 A1 * | 10/2015 | Earle ................... F16H 55/30 474/142 |
| 2016/0053882 A1 | 2/2016 | Watarai |
| 2016/0121966 A1 | 5/2016 | Reiter et al. |
| 2016/0339995 A1 | 11/2016 | Sugimoto |
| 2016/0347409 A1 | 12/2016 | Watarai et al. |
| 2017/0292598 A1 * | 10/2017 | Moore ................. B62M 9/105 |
| 2018/0112764 A1 | 4/2018 | Sugimoto |
| 2018/0170479 A1 | 6/2018 | Sugimoto |
| 2018/0170480 A1 | 6/2018 | Braedt |

FOREIGN PATENT DOCUMENTS

| | | |
|---|---|---|
| EP | 2602176 A1 | 6/2013 |
| EP | 2810864 A1 | 12/2014 |
| FR | 2657134 A1 | 7/1991 |
| GB | 1523626 | 9/1978 |
| JP | S56-042489 | 4/1981 |
| JP | S60-104866 | 6/1985 |
| JP | 1-171795 | 12/1989 |
| JP | 2000-355295 A | 12/2000 |
| JP | 2001-187957 A | 7/2001 |
| JP | 2002-243020 A | 8/2002 |
| JP | 2007-71302 A | 3/2007 |
| JP | 2007-198403 A | 8/2007 |
| WO | 03095867 A1 | 11/2003 |

* cited by examiner

CHAIN RING WITH TEETH OPPOSITELY LATERALLY ENGAGING A DRIVE CHAIN

CROSS-REFERENCES TO RELATED APPLICATIONS

The present application is a continuation of U.S. Nonprovisional application Ser. No. 15/094,389, filed Apr. 8, 2016, which claims priority to U.S. Provisional Patent Application Ser. No. 62/146,635, filed on Apr. 13, 2015, the disclosures of both of which are incorporated herein by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present disclosure relates generally to a chain ring for a vehicle. More particularly, the present disclosure relates to a chain ring that has alternating teeth that may form a wave pattern.

Drive chains used for vehicles like bicycles are formed of alternating links. A first link has a narrow opening. The adjacent second links are wider. As may be seen best in FIG. 1, bicycle drive chains may be made from outer links 100 and inner links 102. In general, the length 104 of each link is about the same. However, the outer links 100 and the inner links 102 differ in width. The outer link 100 may have a width 106 wider than the width 103 of the inner link 102. It will be understood by a person having ordinary skill in the art that in a conventional bicycle drive chain, the series of alternating outer links 100 and inner links 102 alternate for whatever length of drive chain is deemed desirable. The chain as a whole may be referred to as the chain 150.

A conventional chain ring is shown in FIG. 2. The chain ring 210 includes a plurality of teeth 212 of substantially similar size and shape. The use of teeth of substantially similar size and shape may allow for gaps between an outer surface 214 of a tooth 212 and a first inner lateral surface 110 or a second inner lateral surface 112 of an outer link 100 of a drive chain (see FIG. 1). In many conventional applications, these gaps may not drastically hinder performance, but may increase the risk of chain disengagement.

In the past, some manufacturers have attempted to create chains that have alternating teeth. These alternating teeth have been configured to correspond in size and shape more closely to the alternating width of the links in a chain. These teeth have typically been configured to have a set of narrow teeth alternating with a set of wider teeth. However, the use of teeth of larger size also may increase the weight of the chain ring and the vehicle, which may be deemed undesirable. In addition, the use of a tooth of larger size may, in some cases, increase the risk of a tooth catching on a portion of the chain due to that increased size, thereby creating damage or risk of injury. Further, the use of such a design may increase the likelihood of dirt, mud, or other debris becoming entangled in the ring and/or between the teeth of the ring and impeding the meshing of the teeth and the chain.

BRIEF SUMMARY OF THE INVENTION

In one embodiment, a ring for driving a drive chain for a bicycle includes a plurality of teeth that are connected to one another and serially arranged. Each of the plurality of teeth may have a thickness and the thickness of each of the plurality of teeth at its respective thickest point may be substantially identical. A first subset of the plurality of teeth may be configured to have a first cross-sectional shape at a respective base and a second subset of the plurality of teeth may be configured to have a second cross-sectional shape at a respective base.

The first cross sectional shape may be rectangular. The second cross-sectional shape may be non-rectangular. Each of the teeth in the first subset of teeth may be configured to fit within an inner link of a bicycle drive chain. Each of the teeth in the second subset of teeth may be configured to fit within an outer link of a bicycle drive chain. Each of the teeth in the first subset of teeth may be configured to apply lateral pressure in a first direction to a respective link of the bicycle drive chain; such a link may be an inner link of the drive chain. Each of the teeth in the second subset of teeth may be configured to apply lateral pressure in a second direction to a respective link of a bicycle drive chain; such a link may be an outer link of the drive chain. Each of the teeth in the first subset of teeth may have a top surface that may be offset from a centerline of the drive chain when the chain ring and the drive chain are placed in operative position. Each of the teeth in the first subset of teeth and each of the teeth in the second subset of teeth may have top surfaces. The top surfaces may be not symmetrically arranged along a centerline of the drive chain when the ring and the drive chain are placed in operative position.

A drive system for a bicycle may include a drive chain and a chain ring. The drive chain may include a plurality of links. A first link may have a first inner surface at a first plane and an adjacent second link may have a second inner surface at a second plane facing the first inner surface of the first link. A link planar separation may be measured as a shortest distance between the first plane and the second plane. The chain ring may be configured to removably interconnect with the drive chain. The chain ring may include a plurality of teeth joined to one another and serially arranged. The plurality of teeth may include a first tooth and an adjacent second tooth. The first tooth may have a first outer surface at a third plane capable of contacting the first inner surface and the second tooth may have a second outer surface at a fourth plane capable of contacting the second inner surface. A tooth planar separation may be measured as a shortest distance between the third plane and the fourth plane. The tooth planar separation may be at least as great as the link planar separation.

The first tooth may have a first cross sectional shape and the second tooth may have a second cross sectional shape. The first link may be an inner link and the second link may be an outer link. The first tooth may be configured to apply lateral pressure in a first direction to the first link. The second tooth may be configured to apply lateral pressure in a second direction to the second link. The first tooth may have a top surface that may be offset from a centerline of the drive chain. The first tooth and the second tooth may each have a top surface. The top surfaces may be not symmetrically arranged along a centerline of the drive chain. Each of the plurality of teeth may have a thickness and the thickness of each of the plurality of teeth at its respective thickest point may be substantially identical.

In another embodiment, a drive system for a bicycle may include a drive chain and a chain ring. The drive chain may have a plurality of links. A first link may have a first inner surface. The first inner surface may have a centerpoint. An adjacent second link may have a second inner surface facing the first inner surface of the first inner link. The second inner surface may have a centerpoint. A link distance may be measured as a shortest distance between the centerpoint of the first inner surface and the centerpoint of the second inner surface. The chain ring may be configured to removably interconnect with the drive chain. The chain ring may include a plurality of teeth joined to one another and serially arranged. The chain ring may include a first tooth and an adjacent second tooth. The first tooth may have a first outer surface having a centerpoint at its thickest part. The centerpoint of the first tooth may be capable of contacting the first inner surface. The second tooth may have a second outer surface having a centerpoint at its thickest part. The centerpoint of the second tooth may be capable of contacting the second inner surface. A tooth distance may be measured as a shortest distance between the centerpoint of the first outer surface and the centerpoint of the second outer surface. The tooth distance may be at least as great as the link distance.

The first tooth may have a first cross sectional shape and the second tooth may have a second cross sectional shape. The first link may be an inner link and the second link may be an outer link. The first tooth may be configured to apply lateral pressure in a first direction to the first link. The second tooth may be configured to apply lateral pressure in a second direction to the second link. The first tooth may have a top surface that may be offset from a centerline of the drive chain. The first tooth and the second tooth may each have a top surface. The top surfaces may be not symmetrically arranged along a centerline of the drive chain. Each of the plurality of teeth may have a thickness. The thickness of each of the plurality of teeth at its respective thickest point may be substantially identical.

In another embodiment, a drive system for a vehicle may have a drive chain and a chain ring. The drive chain may have a plurality of links and a centerline. The chain ring may have a plurality of teeth joined to one another and serially arranged. Each of the plurality of teeth may be configured to interfit with one of the plurality of links of the drive chain. The thickness of each of the plurality of teeth at its respective thickest point may be substantially identical. Each of the plurality of teeth may have a top surface having a centerline. Each centerline of each top surface of each tooth may be offset laterally in a first direction from the centerline of the drive chain in the same direction. Each of the plurality of teeth may have a base having a centerline. Each centerline of each base of at least a plurality of teeth may be offset laterally in the first direction from the centerline of the drive chain.

Each centerline of each top surface of each tooth may be offset from the centerline of the drive chain in the outboard direction. Each centerline of each top surface of each tooth may be offset from the centerline of the drive chain in the inboard direction.

Each tooth may be configured to place a lateral force on a respective link of the drive chain. A first tooth may be configured to place a first lateral force on a first drive chain link in the first direction. A second tooth may be configured to place a second lateral force on a second drive chain link in a second direction. The first tooth may be adjacent the second tooth. At least one tooth may be positioned circumferentially between the first tooth and the second tooth.

In another embodiment, a drive system for a vehicle may include a drive chain and a chain ring. The drive chain may have a plurality of links and a centerline. The chain ring may have a plurality of teeth joined to one another and serially arranged. Each of the plurality of teeth may be configured to interfit with one of the plurality of links of the drive chain. Each of the plurality of teeth may have a thickness and the thickness of each of the plurality of teeth at its respective thickest point may be substantially identical. Each of the plurality of teeth may have a top surface and a base. The top surfaces of the teeth may be asymmetrically arranged about the centerline of the drive chain. The bases of the teeth may be asymmetrically arranged about the centerline of the drive chain.

Each centerline of each top surface of each tooth may be offset from the centerline of the drive chain in the same direction. Each centerline of each top surface of each tooth may be offset from the centerline of the drive chain in an outboard direction. Each centerline of each top surface of each tooth may be offset from the centerline of the drive chain in an inboard direction.

Each tooth may be configured to place a lateral force on a respective link of the drive chain. A first tooth may be configured to place a first lateral force on a first drive chain link in a first direction and a second tooth may be configured to place a second lateral force on a drive chain link in a second direction. The first tooth may be adjacent the second tooth. At least one tooth may be positioned circumferentially between the first tooth and the second tooth.

In another embodiment, a drive system for a vehicle may include a drive chain and a chain ring. The drive chain may include a plurality of inner links and a plurality of outer links. Each link may comprise an inner plate and an opposite outer plate, each inner plate having a first inner surface facing the outer plate, and each outer plate having a second inner surface facing the inner plate. The chain ring may have a plurality of teeth joined to one another and serially arranged. Each of the plurality of teeth may be configured to interfit with a respective one of the plurality of links of the drive chain. Each of the plurality of teeth may have a thickness and the thickness of each of the plurality of teeth at its respective thickest point may be substantially identical. The plurality of teeth may comprise a first set of teeth and a second set of teeth. Each of the plurality of teeth may have a first outer surface and a first inner surface. Each of the inner surface and the outer surface of each of the first set of teeth may be permitted to contact a corresponding inner surface of one of the inner or outer plate of a respective chain link with which it interfits. At least one portion of one of the first outer surface and the first inner surface of each of the second set of teeth may be configured to remain spaced from only one of the first and second inner surfaces of the respective link with which it interfits, in operative position.

The at least one portion of the second set of teeth may be spaced from the outer plate. The at least one portion of each of the second set of teeth may be spaced from the inner plate.

Each of the second set of teeth may be configured to contact only one of the inner plate and the outer plate. Each of the second set of teeth may be configured to contact the inner plate. Each of the second set of teeth may be configured to contact the outer plate.

In another embodiment, a drive system for a bicycle may include a chain and a chain ring. The chain may have a centerline. The chain ring may be configured to removably interconnect with the drive chain. The chain ring may include a plurality of teeth joined to one another and serially arranged. An average tooth position of the plurality of teeth may be offset from the chain centerline when in operative position. Each of the plurality of teeth may have a thickness. The thickness of each of the plurality of teeth at its respective thickest point may be substantially identical.

Each top surface of each of the plurality of teeth may be offset from the chain centerline when in operative position. The teeth may be arranged asymmetrically about the chain centerline when in operative position. At least a first tooth may be configured to apply a first lateral force to the chain. At least a second tooth may be configured to apply a second lateral force to the chain. The first lateral force and the second lateral force may be applied in substantially opposite directions.

Figure 1A:
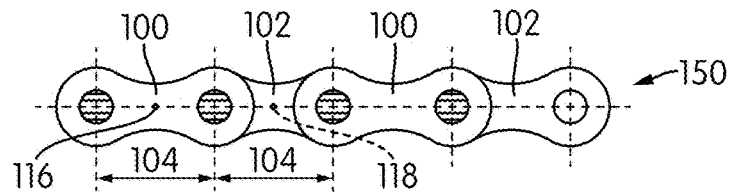
FIG. 1A is a side view of a conventional chain.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object laterally farther from the vertical centerplane of the bicycle. In addition, the terms "bicycle" and "bike" are used herein interchangeably. A person having ordinary skill in the art will understand that if something is referred to as one, it can refer to the other.

One embodiment of a chain ring 300 is shown in FIGS. 3-8. In some respects, the chain ring 300 has a conventional design. For example, the chain ring 300 has a central bore 302 through which a bicycle crank (not shown) may pass. The bicycle crank and/or other hardware may be used to mount the chain ring 300 in operative position on a bicycle (not shown) in any conventional manner. A plurality of teeth 304 may be joined or connected to one another and may be serially arranged and radially spaced around a circumference 306 of the chain ring 300.

As may be best seen from the views shown in FIGS. 4-7, the teeth 304 may be separated into two subsets that have differing shapes. A first subset of teeth may include first tooth 400, second tooth 402, and third tooth 404. A second subset of teeth may include fourth tooth 406, fifth tooth 408, and sixth tooth 410. As will be apparent to a person having ordinary skill in the art, each tooth in the first subset of teeth may be substantially identical to one another. Similarly, each tooth in the second subset of teeth may be substantially identical to one another. In the illustrated embodiment, each tooth on the chain ring 300 is either one of the first subset of teeth or the second subset of teeth. However, in other embodiments, a chain ring may include one or more teeth that have a shape and size that do not match the size and shape of one of the first and second subset of teeth as may be desired. In the illustrated embodiment, teeth from the first and second subsets may be interspersed or alternated with one another. That is, each tooth in the first subset may be adjacent two teeth from the second subset. For example, the first tooth 400 of the first subset may be between the fourth tooth 406 and the fifth tooth 408 of the second subset. Similarly, each tooth in the second subset may be adjacent two teeth from the first subset. For example, the fifth tooth 408 of the second subset may be between the first tooth 400 and the second tooth 402 of the first subset.

The determination of whether a tooth is in the first subset or the second subset may be made by considering the shape and size of the respective tooth at its thickest point. In the illustrated embodiments, the widest or thickest point of each of the plurality of teeth may be at its base. However, in another embodiment, the thickest point of a respective tooth may be elsewhere on the tooth. In the present embodiment, where a particular configuration is described as being at the "base" of the tooth, a person of ordinary skill in the art will understand that term to include a thickest point of a tooth, regardless of where it appears along a height of the tooth. Similarly, the terms "thickness" and "width" and their related forms may be used interchangeably in the present disclosure. A person having ordinary skill in the art will understand that the terms "width" and "thickness" refer to the dimension of a tooth or ring generally perpendicular to the driving direction of the tooth and ring. In many embodiments, each of the plurality of teeth may have a thickness. The thickness of each of the plurality of teeth at its respective thickest point may be substantially identical to the thickness of each of the remaining teeth in the plurality of teeth at their respective thickest points.

Figure 6:
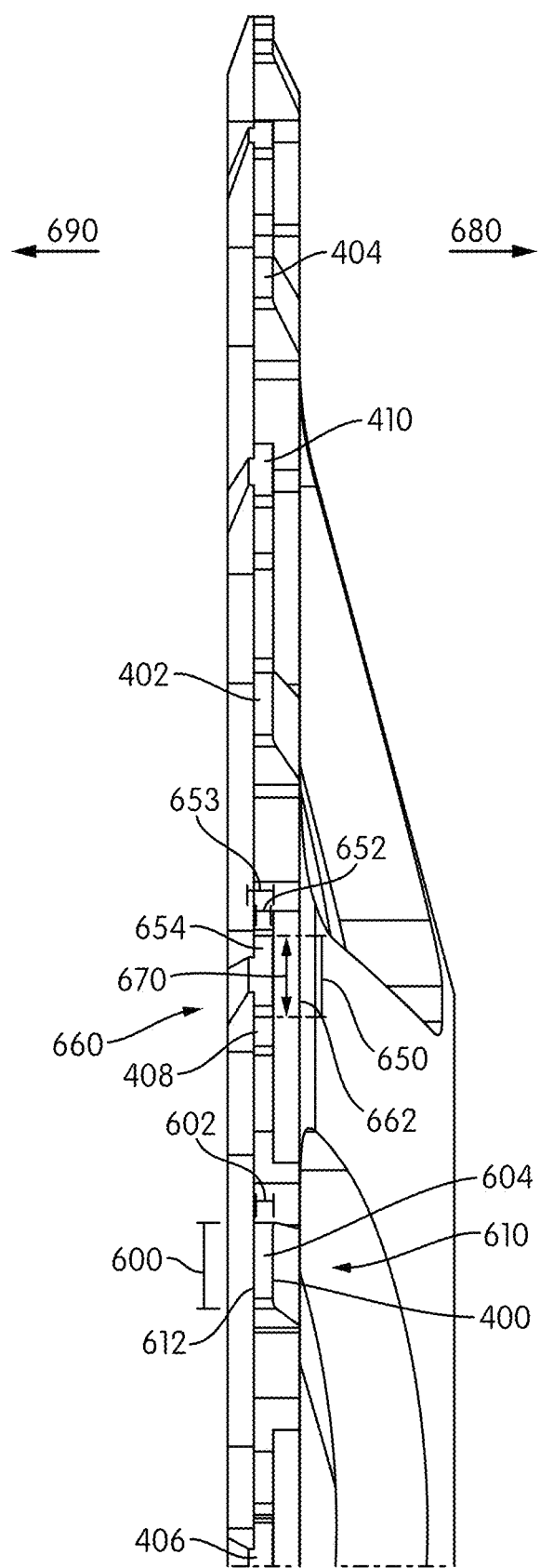
FIG. 6 is a end view of the chain ring of FIG. 3.
Figure 7:
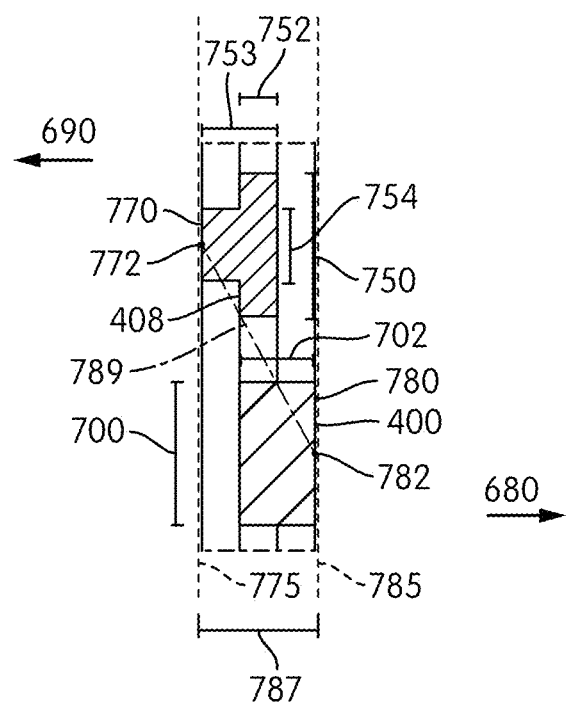
FIG. 7 is a partial cross-sectional view of the chain ring of FIG. 3 taken along line 7-7 of FIG. 4.

The shape and size of each tooth at a top surface may be best seen in FIG. 6 and the shape and size of each tooth at a thickest point thereof may be best seen in FIG. 7.

Because each tooth in the first subset of teeth is substantially identical, each respective tooth in the first subset may be described in the same manner and may have the same properties as the first tooth 400, which will be described herein. Because each tooth in the second subset of teeth is substantially identical, each respective tooth in the second subset may be described in the same manner and may have the same properties as the fifth tooth 408, which will be described herein.

As shown in FIG. 6, the top surface of 604 of the first tooth 400 may be substantially rectangular. The top surface 604 may have a length 600 and a width or thickness 602. The thickness of the first tooth 400 may increase from its top surface 604 to its base 608 (see FIG. 4) in a first direction 680 outward on a first side 610 of the first tooth 400, and thus the first side 610 may be considered tapered. In the embodiment illustrated in FIG. 6, the first direction 680 may be an outboard direction.

As shown in FIG. 7, at its base 608, the first tooth 400 may have a first cross sectional shape. In some embodiments, the first cross sectional shape may be a rectangular cross sectional shape. At the thickest point 608, the first tooth 400 may have a length 700 and a thickness 702. The thickness 702 may be greater than the thickness 602.

As shown in FIG. 6, the top surface 654 of the fifth tooth 408 may be substantially hat-shaped. The top surface 654 may have a length 650, a thickness 652 at its narrowest point (the "brim"), and a thickness 653 at its widest point (the "crown"). The thickness of the widest part of the fifth tooth 408 may increase from its top surface 654 to its base 658 (see FIG. 4) in a second direction 690 outward on a second side 660 of the fifth tooth 408. In some embodiments, such as the one shown, the fifth tooth 408 may widen more greatly along a length 670 that is about one-half of the length 650 of the fifth tooth 408. In the embodiment shown in FIG. 6, the second direction is an inboard direction.

As shown in FIG. 7, at its base 658, the fifth tooth 408 may have a second cross-sectional shape. In some embodiments, the second cross sectional shape may be a hat-shaped cross-sectional shape. At the base 658, the fifth tooth 408 may have a length 750, a thickness 752 at its narrowest point, and a thickness 753 at its widest point. The thickness 753 at the widest point may be greater than the thickness 653 at the widest point at the top surface 654 of the fifth tooth 408.

As may be best seen in FIG. 6, a portion of each tooth may be aligned with a portion of each other tooth. As may be seen, the first tooth 400 has a rectangular top surface 604 having a length 600 and a width 602. The fifth tooth 408 in its narrow portion can also be considered to have a rectangular surface having a length 650 and a width 652. In some embodiments, the length 600 of the first tooth 400 may be substantially identical to the length 650 of the fifth tooth 408. In some embodiments, the width 602 of the first tooth 400 may be substantially identical to the width 652 of the fifth tooth 408. In many embodiments, the teeth 400, 408 may be arranged such that these identical rectangular portions are aligned with each other around the circumference 306 of the chain ring 300.

In other embodiments, the size, shape, and placement of the top surfaces of the teeth may vary from the exemplary designs shown. While the illustrated embodiments show each tooth having a rectangular top surface portion, the top surfaces of the teeth may have non-rectangular shapes and may have shapes different from one another. In some embodiments, the top surfaces may be offset from one another.

In the embodiment shown, the thickness 653 of the fifth tooth 408 may be greater at the widest point of its top surface 654 than the thickness 602 of the first tooth 400 at the widest point of its top surface. As will be seen in FIG. 10 below, in some embodiments, the fifth tooth 408 may be designed such that the fifth tooth 408 may have only a rectangular portion at the top surface 654 having the thickness 652. Such a taper may be desirable in some embodiments, and accordingly, the increase in thickness to a thickness 653 may be optional in some embodiments.

Figure 4:
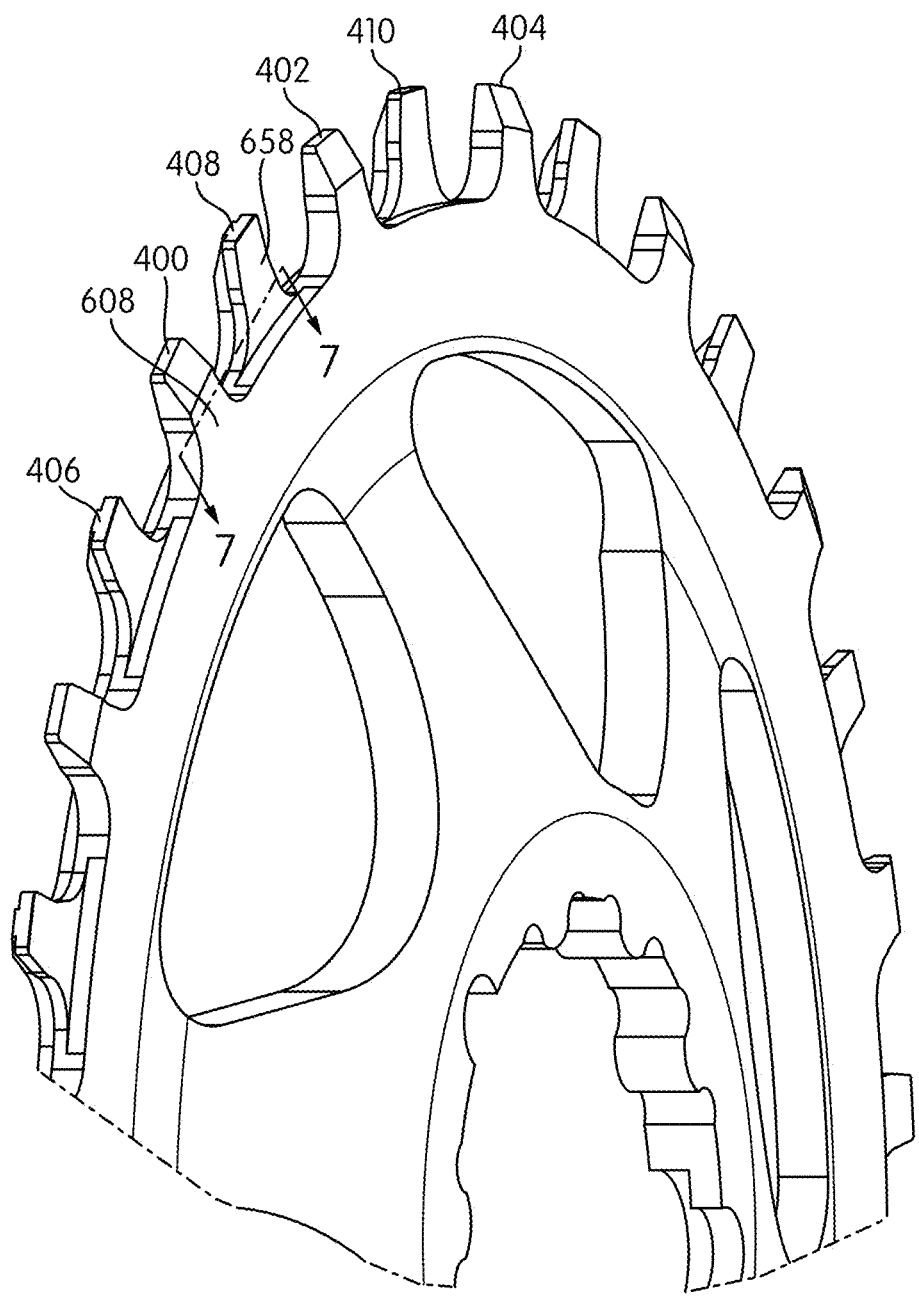
FIG. 4 is a perspective view of the chain ring of FIG. 3 from the side of one plurality of teeth.
Figure 5:
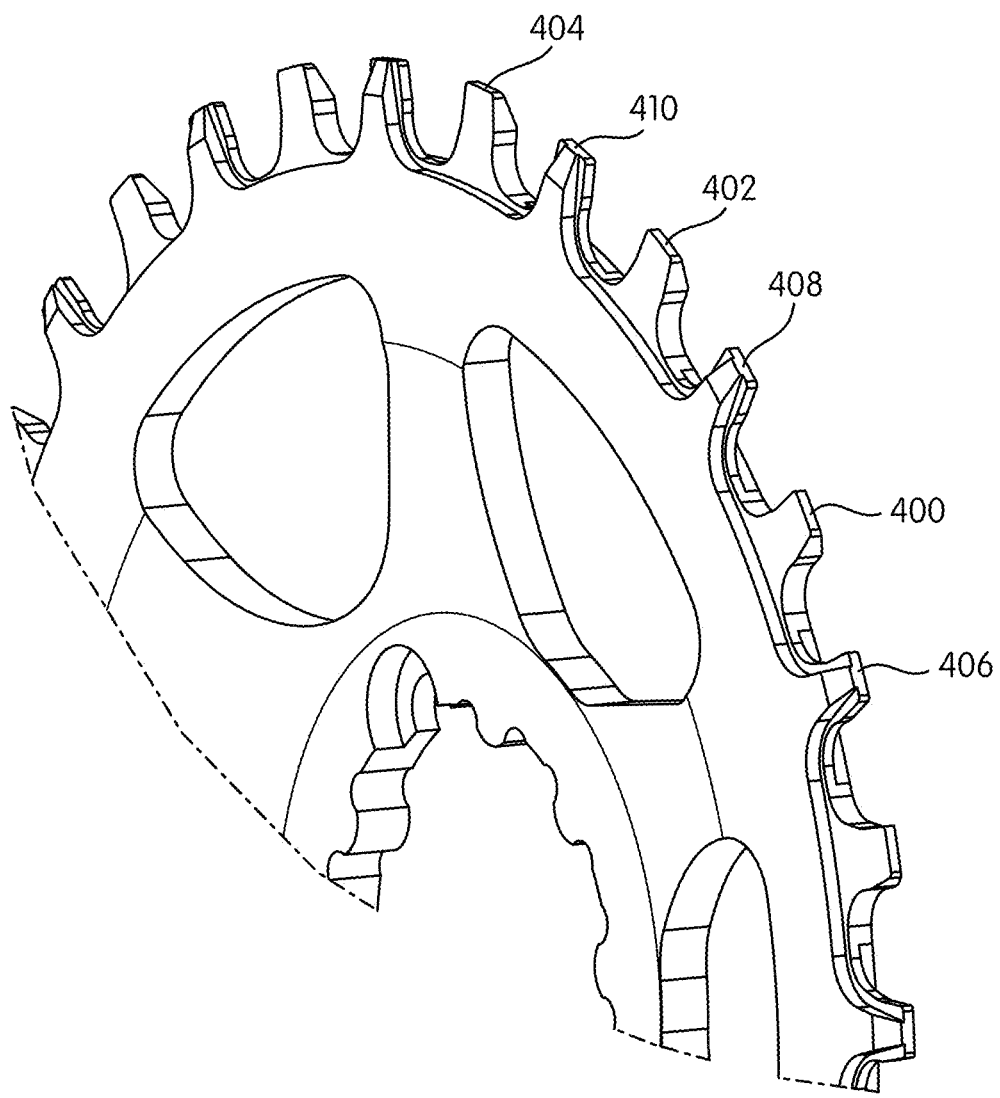
FIG. 5 is a perspective view of the chain ring of FIG. 3 from the side of another plurality of teeth.

Further, each tooth 400, 408 may be configured to have one side that is more highly tapered than the other, or one side may be tapered and the opposite side may not be tapered at all. In the embodiment illustrated in FIGS. 6 and 7, each tooth 400, 408 may have a respective tapered side. The first side 610 of the first tooth 400 may be the tapered or more tapered side and the second side 660 of the second tooth 408 may be the tapered or more tapered side. Each tooth 400, 408 may similarly have a less tapered or substantially planar side. The second side 612 of the first tooth 408 may be less tapered or the substantially planar side and the first side 662 of the second tooth 408 may be less tapered or the substantially planar side. While this feature of tapering in opposite directions may be seen in FIGS. 6 and 7, it may be more apparent in a comparison of the views of FIGS. 4 and 5, showing a perspective view of the chain ring from opposite directions. In some embodiments, the opposite directions and magnitudes of the taper may be designed to facilitate a function of the teeth 400, 408, namely, to create opposing lateral forces on adjacent links of a drive chain. The teeth 400, 408 may be configured such that the more tapered side 610, 660 of the respective tooth 400, 408 may be the side that is configured to apply a lateral force to a drive chain link. The respective opposite, less tapered side 612, 662 may be configured to be spaced from an interfitting drive chain link or to merely be permitted to contact the interfitting link slightly. These features of the drive train as a whole will be disclosed in greater detail in connection with at least FIGS. 9 and 10.

Looking now at FIG. 7, the thicknesses of the teeth may also be understood in relation to each other. In many embodiments, the thickness 702 of the first tooth 400 may desirably be substantially identical to the thickness 753 of the fifth tooth 408 at its widest point. In many embodiments, the length 700 of the first tooth 400 may be substantially identical to the length 754 of the fifth tooth 408. Thus, even though the cross-sectional shapes of the teeth may differ, each of the plurality of teeth may have substantially the same width or thickness and substantially the same length.

Figure 8:
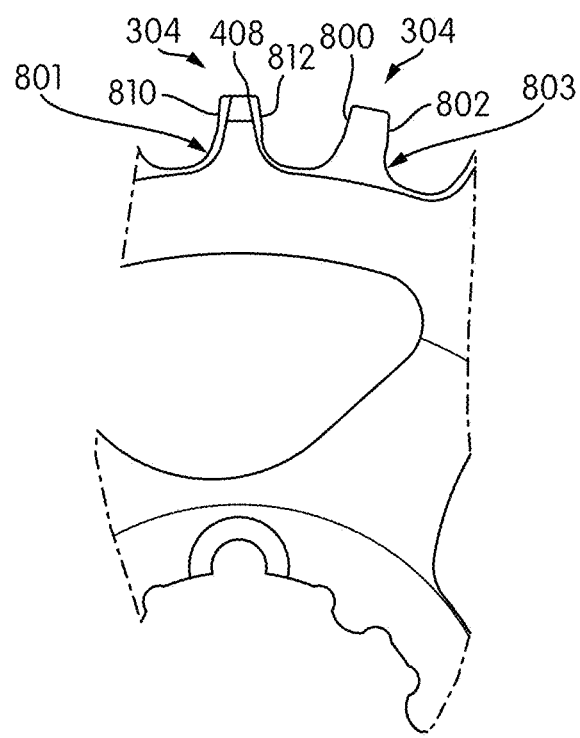
FIG. 8 is a side view of a plurality of teeth showing one embodiment of a shape of the teeth.

Turning now to FIG. 8, a closer side view of the first tooth 400 and the fifth tooth 408 from the inboard side may be seen. The first tooth 400 may have a leading edge 800 and a trailing edge 802. The fifth tooth 408 may have a leading edge 810 and a trailing edge 812. In the embodiment shown, the each edge 800, 802, 810, 812 of each tooth may angle in the direction of rotation. The use of such an angle may provide a variety of functions, such as, improving the mating of the teeth 304 with a drive chain (not shown). Such an angled portion is merely one example of an appropriate tooth shape. Within the present disclosure, each tooth may be described as having a base, and various features of the teeth at the base may be described. The base of a tooth may be considered to be the general area on the tooth where it begins projecting from the central portion of the chain ring. As an example only, the base of the first tooth 400 may be in the area identified as 801 and the base of the fifth tooth 408 may be in the area identified as 803.

The illustrated embodiments disclose very few configurations of teeth that may be used. In many embodiments, it may be desirable for all the teeth to have similar shapes and sizes. In other embodiments, the teeth may vary in shape and size. In some embodiments, only teeth having a shape and size corresponding to one of the first subset and the second subset may be used. In other embodiments, teeth having a configuration different from that disclosed as being desirable for the first and second subset may be used. In many embodiments, it may be desirable for the chain ring to include substantially the same number of teeth in the first subset and the second subset. In many embodiments, it may be desirable for the chain ring to have an alternating pattern of teeth in the first subset and teeth in the second subset around the entire circumference. In the disclosed embodiments, the crown portion of the hat-shaped cross section in the second subset of teeth is shown as being one half the length of the remainder of the tooth. However, in other embodiments, the crown portion may be longer or shorter, based on the circumference of the ring or the number of teeth thereon, or for any other reason deemed relevant by a designer. In other embodiments, rather than the leading and trailing edges both being angled in the direction of rotation, the leading edge may be angled away from the direction of rotation to provide a reduced surface area for the tooth at the top surface. In other embodiments, the leading and trailing edges may not include any substantial taper. Other modifications to the design are possible and will be understood by a person having ordinary skill in the art to fall within the scope of the disclosure.

Figure 9:
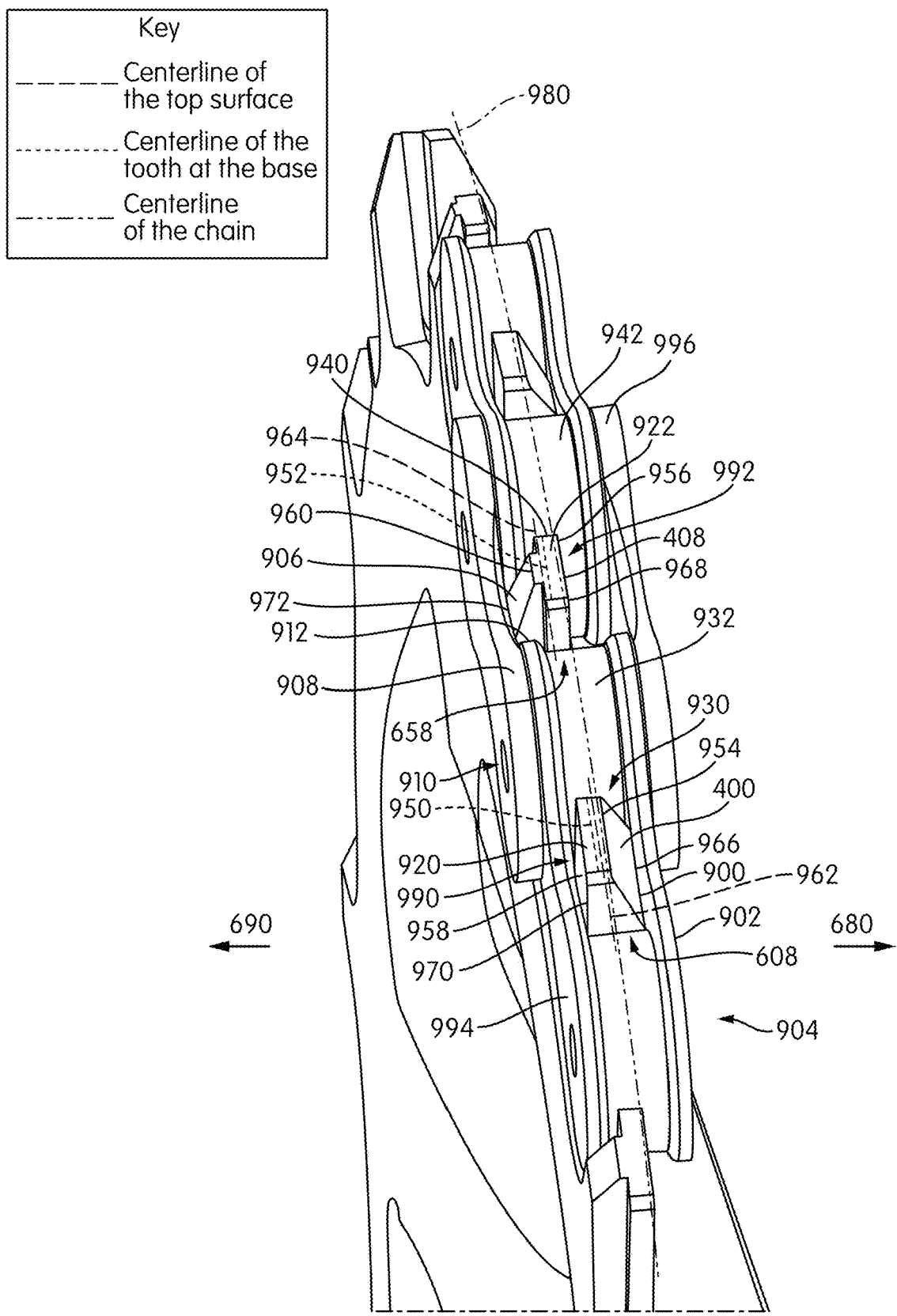
FIG. 9 is a perspective view showing the interaction of the chain ring of FIG. 3 with a portion of a drive chain.

Turning now to FIG. 9, the interaction of the chain ring teeth and the drive chain is shown. FIG. 9 shows the interaction and relative position of one outer link of a drive chain with a tooth of the second subset and the interaction and relative position of the two flanking inner links of a drive chain with teeth of the first subset. As is conventional, the chain ring may be configured to removably interconnect with the drive chain in order to drive or propel the bicycle. A person having ordinary skill in the art will recognize that in operative position, a plurality of many more chain links, both inner and outer, will be present and engaged with the teeth and other parts to drive the bicycle. Only three links are shown in this FIG.

Looking first at the first tooth 400, the first tooth 400 may be configured to fit within or interfit with a respective first link 904 of the drive chain in operative position. In the illustrated embodiment, the first link 904 may be an inner link. A first face 900 of the first tooth 400 may contact a first plate 902 of a first link 904 of the drive chain. The first face 900 of the first tooth 400 may correspond to the more tapered side 610 of the first tooth 400. This contact between the face 900 and the first link 904 may apply a lateral pressure or force on the first link 904 in the first lateral direction 680. In this embodiment, the first lateral direction may be outboard. The drive face 930 of the first tooth 400 may contact a roller 932 of the drive chain to impart driving force to the drive chain and other drive train elements. The first tooth 400 may also have a second face 990, which may correspond to the less tapered face 612 of the first tooth 400. The second face 990 may be configured to be spaced from the second plate 994 of the first link 904 of the drive chain. In other embodiments, the second face 990 may be permitted to contact the second plate 994 of the first link of the drive chain. In some embodiments, the configuration of the second face 990 as a substantially planar surface in conjunction with the remaining features of the configuration (which will be described in greater detail below) may enable the second face 990 to remain spaced from the second plate 994 in use.

Looking next at the fifth tooth 408, the fifth tooth 408 may be configured to fit within or interfit with a respective second link 910 of the drive chain. In the illustrated embodiment, the second link 910 may be an outer link. The outer face 906 of the fifth tooth 408 may contact a second plate 908 of the second link 910 of the drive chain. The outer face 906 of the fifth tooth 408 corresponds to the more tapered side 660 of the fifth tooth 408. This contact between the face 906 and the second link 910 may apply a lateral pressure or force on the second link 910 in the second lateral direction 690. In this embodiment, the second lateral direction may be inboard. In some embodiments, the fifth tooth 408 may also engage an edge 912 of an adjacent first link 904, but may not apply a substantial force thereto. The drive face 940 of the fifth tooth 408 may contact a roller 942 of the drive chain to impart driving force to the drive chain and other drive train elements. The fifth tooth 408 may also have a second face 992, which may correspond to the less tapered face 662 of the fifth tooth 408. The second face 992 may be configured to be spaced from the second plate 996 of the second link 910 of the drive chain. In other embodiments, the second face 992 may be permitted to contact the second plate 996 of the second link 910 of the drive chain. In some embodiments, the configuration of the second face 992 as a substantially planar surface in conjunction with the remaining features of the configuration, such as a common thickness between all the teeth (which will be described in greater detail below) may enable the second face 992 to remain spaced from the second plate 996 in use.

Figure 1B:
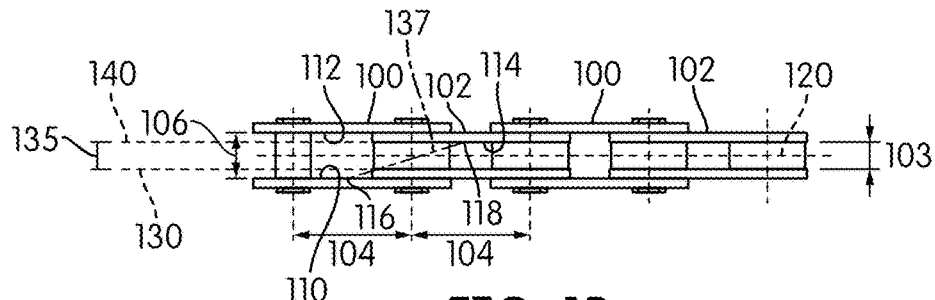
FIG. 1B is a side view of a conventional chain.
Figure 2:
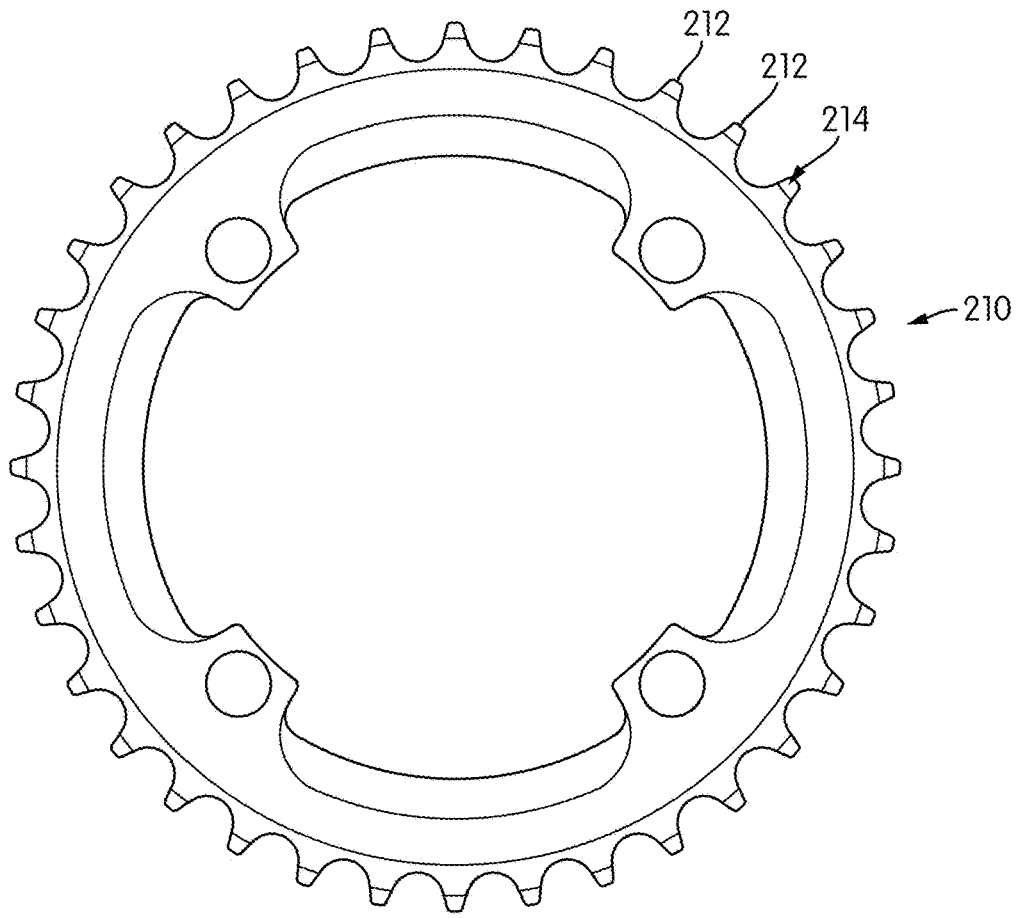
FIG. 2 is a side view of a conventional chain ring.
Figure 3:
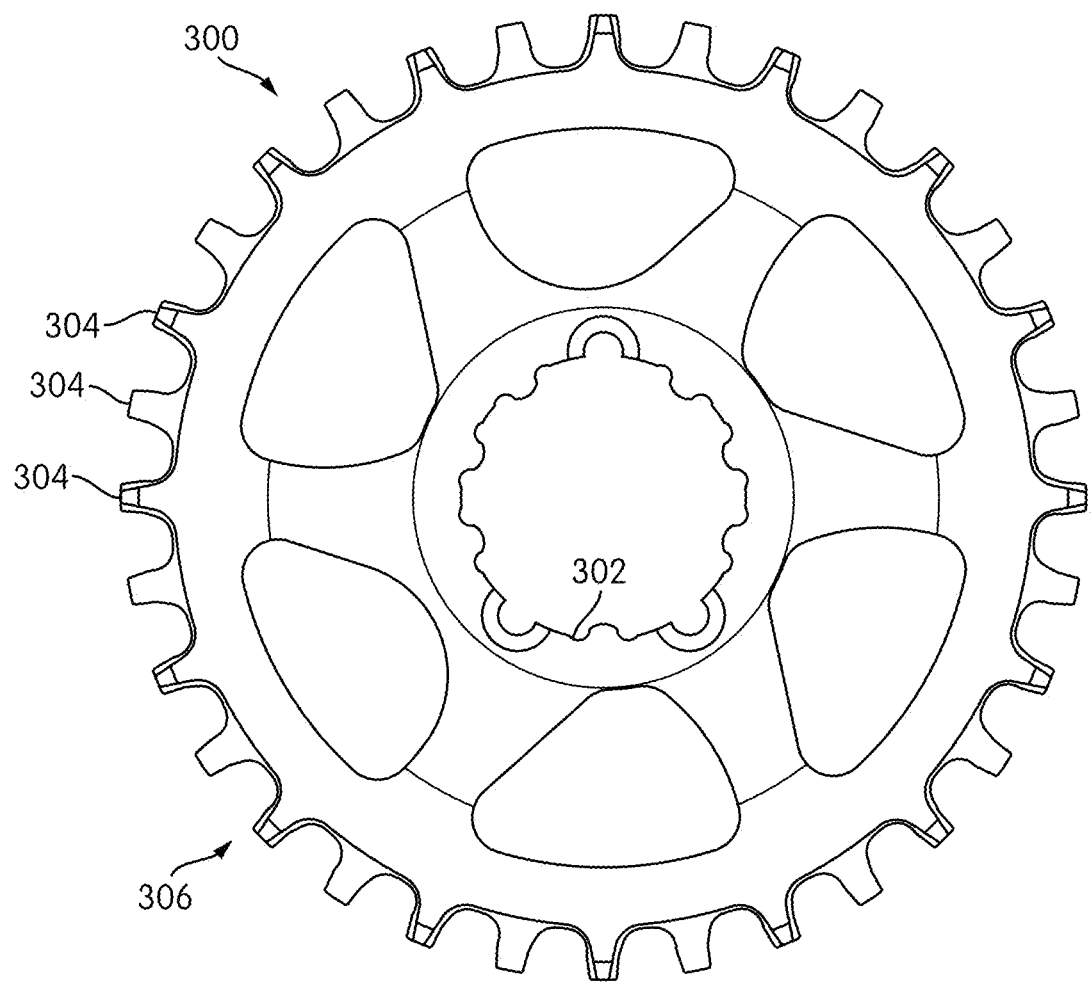
FIG. 3 is a side view of one embodiment of a chain ring in accordance with the disclosure.

Looking at FIG. 1, any chain 150 may have a centerline 120. As may be seen in FIG. 9, the first tooth 400 and the fifth tooth 408 may be arranged such that their top surfaces are offset from the centerline 980 of the chain. The first tooth 400 may taper to a first rectangular top face 920. The fifth tooth 408 may taper to include a second rectangular portion of the top face 922. The first rectangular top face 920 and the second rectangular top face 922 may be aligned with each other, as was also discussed in connection with FIG. 6. Comparing the positions of the first rectangular top face 920 and the second rectangular top face 922 relative to the centerline 980 of the drive chain, it is apparent that the first rectangular top face 920 and the second rectangular top face 922 may be offset laterally from the centerline 980. The particular lateral offset between the top faces 920 and 922 may vary depending on the desires of a designer. However, in many embodiments, the top faces 920 and 922 may be positioned such that they are not symmetrical about the centerline 980 of the drive chain. As may be seen, the top surface 920 may have a first top surface centerline 950, and top surface 922 may have a second top surface centerline 950. It will be understood by a person having ordinary skill in the art that the respective centerline 950, 952 of a respective top surface 920, 922 of a respective tooth 400, 408 may be defined as the line defining the lateral middle of the respective top surface 920, 922 between a respective first top surface edge 954, 956 and a respective second top surface edge 958, 960. In the embodiment illustrated in FIG. 9, the first top surface edge 954, 956 may be an outermost edge and the second top surface edge 958, 960 may be an innermost edge. In another embodiment, the first top surface edge 954, 956 may be an innermost edge and the second top surface edge 958, 960 may be an outermost edge.

As may be seen in FIG. 9, the respective centerlines 950 and 952 may be both offset laterally from the centerline 980 of the drive chain in operative position. In the illustrated embodiment, the respective centerlines 950, 952 may be offset laterally from the centerline 980 in the same direction, namely, an inboard direction. In another embodiment, the centerlines may be offset laterally in an outboard direction or may each be offset laterally in a different direction.

In addition, the teeth 400 and 408 and the remainder of the plurality of teeth may each be considered to have a position across a thickness of the chain ring. This relationship may be best seen in FIG. 6. Comparing the view of FIG. 6 to the view of FIG. 9, and considering the description in the preceding paragraphs, each of the plurality of teeth may be considered to have a position relative to the centerline 980 of the chain. In some embodiments, the tooth position of a tooth may be defined as the centerline of the respective tooth at a base of that tooth. As shown in FIG. 9, the centerline 950 of the tooth 400 and the centerline 952 of the tooth 408 are both offset from the centerline 980 of the chain. Accordingly, an evaluation of the centerlines at the bases may reveal an average tooth position for the plurality of teeth as a whole. In many embodiments, such as the one shown in FIG. 9, the average tooth position may be offset from the centerline 980 of the drive chain in operative position.

In addition, the top surfaces 920 and 922 may also be arranged laterally asymmetrically about the centerline 980 of the drive chain in operative position. When viewing the top surfaces 920 and 922 relative to the centerline 980, it is apparent that lateral symmetry is not present. Indeed, FIG. 9 shows both the top surface 920 and the top surface 922 may be offset laterally from the chain centerline 980. Both top surfaces 920, 922 may be offset laterally in the same direction from the chain centerline 980. In the illustrated embodiment, the top surfaces 920, 922 may be offset laterally on an inboard side of the chain centerline 980. In another embodiment, the top surfaces 920, 922 may both be offset laterally from the chain centerline 980 in an outboard direction. In another embodiment, the top surfaces 920, 922 may be offset laterally in different directions from the chain centerline 980 or otherwise offset in another manner that is asymmetrical.

Further, the respective bases 608, 658 of the teeth 400, 408 may have a similar relationship to the chain centerline 980 as their top surfaces 920, 922. As may be seen, the first base 608 may have a first base centerline 962, and the second base 658 may have a second base centerline 964. It will be understood by a person having ordinary skill in the art that the respective centerline 962, 964 of a respective base 608, 658 of a respective tooth 400, 408 may be defined as the line defining the lateral middle of the respective base 608 between a respective first base side 966, 968 and a respective second base side 970, 972. In the embodiment illustrated in FIG. 9, the first base side 966, 968 may be an outermost side and the second base side 970, 972 may be an innermost side. In another embodiment, the first base side 966, 968 may be an innermost side and the second base side 970, 972 may be an outermost side.

As may be seen in FIG. 9, the respective centerlines 962 and 964 may be both offset laterally from the centerline 980 of the drive chain in operative position. However, in many embodiments, the first base centerline 962 may be aligned, such as coincident, with the chain centerline 980. In the illustrated embodiment, the respective centerlines 962, 964 may be offset laterally from the centerline 980 in the same direction, namely, an inboard direction. In another embodiment, the centerlines may be offset laterally in an outboard direction or may each be offset laterally in a different direction.

In addition, the bases 608, 658 may also be arranged laterally asymmetrically about the centerline 980 of the drive chain in operative position. When viewing the bases 608, 658 relative to the centerline 980, it is apparent that lateral symmetry is not present. In the illustrated embodiment, the first base 608 may be arranged substantially on or symmetrically about the chain centerline 980, while the second base 658 may be offset laterally from the centerline 980, in this embodiment in an inboard direction. This difference in offset may create asymmetry in positioning.

In some embodiments, only one of the top surfaces may be offset laterally from a centerline of the drive chain in operative position. In some embodiments, only the top surface of the first tooth may be offset laterally from a centerline of the drive chain when the chain ring and the drive chain are placed in operative position. The top surface of the second tooth may be positioned laterally symmetrically around the drive chain centerline. In other embodiments, the top surfaces of the first tooth and the second tooth may be offset laterally from the drive chain centerline in opposite directions. In those embodiments, the top surfaces may be arranged such that they are not laterally symmetrically arranged with respect to one another along a centerline of the drive chain when the chain ring and the drive chain are placed in operative position.

It will be apparent to one of ordinary skill in the art that, among the reasons that each respective tooth in the first subset of teeth may be positioned between two teeth in the second subset of teeth (and vice versa) in an alternating pattern around the chain ring, is that a drive chain typically has alternating inner links and outer links along its length. The chain ring may be configured to have alternating teeth configured to fit into the appropriate width and shape of alternating link. It will be apparent to a person having ordinary skill in the art that while the illustrated embodiment envisions the first subset of teeth applying a lateral force to the chain in an outboard direction and the second subset of teeth applying a lateral force to the chain in an inboard direction, the teeth could be oppositely oriented and positioned on the chain ring to apply force in the opposite directions. A person having ordinary skill in the art is able to make such a modification without undue experimentation.

Figure 10:
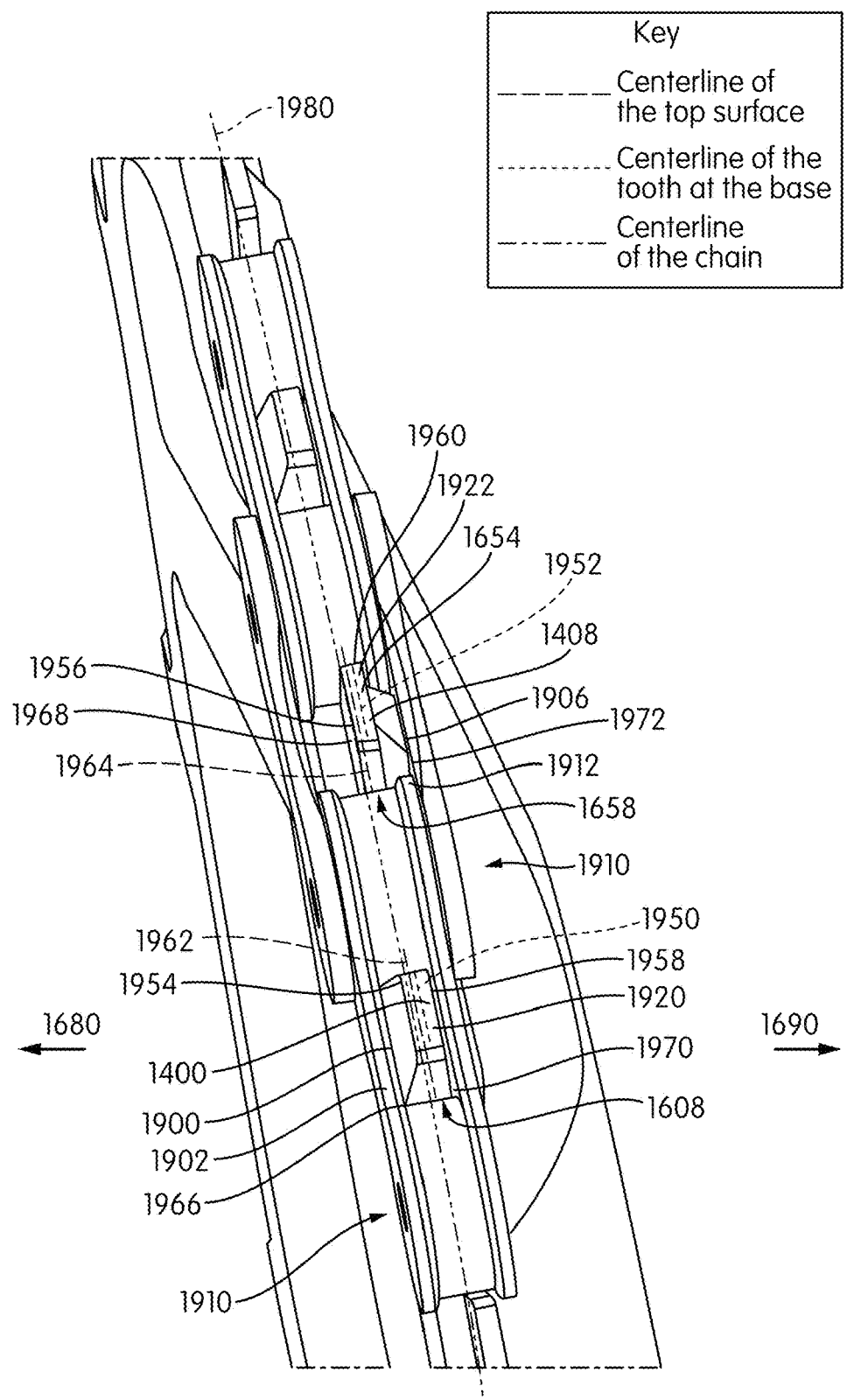
FIG. 10 is a perspective view showing the interaction of another embodiment of a chain ring according to the disclosure with a portion of a drive chain.

FIG. 10 illustrates a few modifications that may be made to the configuration. In brief, the degree of taper of the second tooth is changed and the directions of taper of the first and second teeth are reversed. However, the comparative features of the teeth remain, such as the inclusion of tapers in opposite directions, the spacing of the faces of the teeth relative to the links of the chain, the differing cross sectional shapes of the teeth, and any other features not specifically mentioned.

In the embodiment of FIG. 10, the top surface 1654 of the fifth tooth 1408 may be rectangular instead of hat-shaped. In this embodiment, the fifth tooth 1408 tapers more greatly toward the top surface than the fifth tooth that is shown and described in the embodiment above. Accordingly, the top surface 1654 may be rectangular or substantially rectangular. A person having ordinary skill in the art will be able to easily select an appropriate taper as the designer deems appropriate.

In addition, the directions of taper are reversed from those of FIG. 9. Looking first at the first tooth 1400, the first tooth 1400 may be configured to fit within an inner link 1904 of the drive chain. The first tooth 1400 may project outwardly in a first direction 1680. The outer face 1900 of the first tooth 1400 may contact a first plate 1902 of an inner link 1904 of the drive chain. This contact between the face 1900 and the inner link 1904 may apply a lateral pressure on the inner link 1904 in the first lateral direction 1680. In this embodiment, the first direction 1680 may be inboard.

Looking next at the fifth tooth 1408, the fifth tooth 1408 may be configured to fit within an outer link 1910 of the drive chain. The first tooth 1408 may project outwardly in a second direction 1690. The outer face 1906 of the fifth tooth 1408 may contact a second plate 1908 of an outer link 1910 of the drive chain. This contact between the face 1906 and the outer link 1910 may apply a lateral pressure on the outer link 1910 in the second lateral direction 1690. In some embodiments, the fifth tooth 1408 may also engage an edge 1912 of an adjacent inner link 1904, but may not apply a substantial force thereto. In this embodiment, the second lateral direction 1690 may be outboard.

The inclusion of FIG. 10 illustrates merely a few changes that can easily be made by a person having ordinary skill in the art to the design while still within the scope of the disclosure. Each of these modifications will be understood to form a part of the disclosure and claims herein.

As may be seen, the top surface 1920 of the first tooth 1400 may have a first top surface centerline 1962, and the top surface 1922 of the second tooth 1408 may have a second top surface centerline 1952. It will be understood by a person having ordinary skill in the art that the respective centerline 1962, 1952 of a respective top surface 1920, 1922 of a respective tooth 1400, 1408 may be defined as the line defining the lateral middle of the respective top surface 1920, 1922 between a respective first top surface edge 1954, 1956 and a respective second top surface edge 1958, 1960. In the embodiment illustrated in FIG. 10, the first top surface edge 1954, 1956 may be an innermost edge and the second top surface edge 1958, 1960 may be an outermost edge. In another embodiment, the first top surface edge 1954, 1956 may be an outermost edge and the second top surface edge 1958, 1960 may be an innermost edge.

As may be seen in FIG. 10, the respective centerlines 1962 and 1952 may be both offset laterally from the centerline 1980 of the drive chain in operative position. In the illustrated embodiment, the respective centerlines 1962, 1952 may be offset laterally from the centerline 1980 in the same direction, namely, an outboard direction. In another embodiment, the centerlines may be offset laterally in an inboard direction or may each be offset in a different direction.

In addition, the top surfaces 1920 and 1922 may also be arranged laterally asymmetrically about the centerline 1980 of the drive chain in operative position. When viewing the top surfaces 1920 and 1922 relative to the centerline 1980, it is apparent that lateral symmetry is not present. Indeed, FIG. 10 shows both the top surface 1920 and the top surface 1922 may be offset laterally from the chain centerline 1980. Both top surfaces 1920, 1922 may be offset laterally in the same direction from the chain centerline 1980. In the illustrated embodiment, the top surfaces 1920, 1922 may be offset laterally on an outboard side of the chain centerline 1980. In another embodiment, the top surfaces 1920, 1922 may both be offset laterally from the chain centerline 1980 in an inboard direction. In another embodiment, the top surfaces 1920, 1922 may be offset laterally in different directions from the chain centerline 1980 or otherwise offset in another manner that is asymmetrical.

Further, the respective bases 1608, 1658 of the teeth 1400, 1408 may have a similar relationship to the chain centerline 1980 as their top surfaces 1920, 1922. As may be seen, the first base 1608 may have a first base centerline 1950, and the second base 1658 may have a second base centerline 1964. It will be understood by a person having ordinary skill in the art that the respective centerline 1950, 1964 of a respective base 1608, 1658 of a respective tooth 1400, 1408 may be defined as the line defining the lateral middle of the respective base 1608 between a respective first base side 1966, 1968 and a respective second base side 1970, 1972. In the embodiment illustrated in FIG. 10, the first base side 1966, 1968 may be an innermost side and the second base side 1970, 1972 may be an outermost side. In another embodiment, the first base side 1966, 1968 may be an outermost side and the second base side 1970, 1972 may be an innermost side.

As may be seen in FIG. 10, the respective centerlines 1950 and 1964 may be both offset laterally from the centerline 1980 of the drive chain in operative position. However, in many embodiments, the first base centerline 1962 may be aligned with the chain centerline 1980. In the illustrated embodiment, the respective centerlines 1962, 1964 may be offset laterally from the centerline 1980 in the same direction, namely, an outboard direction. In another embodiment, the centerlines may be offset laterally in an inboard direction or may each be offset laterally in a different direction.

In addition, the bases 1608, 1658 may also be arranged laterally asymmetrically about the centerline 1980 of the drive chain in operative position. When viewing the bases 1608, 1658 relative to the centerline 1980, it is apparent that lateral symmetry is not present. In the illustrated embodiment, the first base 1608 may be arranged substantially on or symmetrically about the chain centerline 1980, while the second base 1658 may be offset laterally from the centerline 1980, in this embodiment in an outboard direction. This difference in offset may create asymmetry in positioning.

The size, shape, and position of the teeth of the chain ring may be selected such that the nominal width of the teeth is greater than the nominal width of adjacent links. Returning to FIG. 1, the first inner lateral surface 110 of the outer link 100 may be considered to lie in, at, outside of, or along a first plane 130. A third inner lateral surface 114 of the inner link 102 may be considered to lie in, at, outside of or along a second plane 140. The first inner lateral surface 110 and the third inner lateral surface 114 of the respective links may face one another. The link nominal width or link planar separation may be measured as the shortest distance between the first plane 130 and the second plane 140 measured substantially perpendicular to the first plane 130 and the second plane 140. One exemplary location of measurement is shown at 135.

Similarly, the first inner lateral surface 110 may have a first centerpoint 116. Because chain link plates are generally both horizontally and vertically symmetrical, the first centerpoint 116 may be positioned at a point where the horizontal and vertical axes of symmetry intersect. The third inner lateral surface 114 may have a similarly defined second centerpoint 118. A link distance may be measured as the shortest distance between the first centerpoint 116 and the second centerpoint 118 of two adjacent links. One exemplary location of measurement is shown at 137.

Turning now to FIG. 7, the outer face 780 of the first tooth 400 may be said to lie in a third plane 785. The outer face 770 of the fifth tooth 408 may be said to lie in a fourth plane 775. The tooth nominal width or tooth planar separation may be measured as the shortest distance between the third plane 785 and the fourth plane 775 measured substantially perpendicular to the third plane 785 and the fourth plane 775. One exemplary location of measurement is shown at 787.

Similarly, outer face 780 of the first tooth 400 may have a first centerpoint 782. The first centerpoint 782 may be defined as the longitudinal middle point of the widest section of the first tooth 400 measured at the base. The outer face 770 of the fifth tooth 408 may have a similarly defined second centerpoint 772. A tooth distance may be measured as the shortest distance between the first centerpoint 782 and the second centerpoint 772. One exemplary location of measurement is shown at 789.

In many embodiments, the amount of lateral pressure on the drive chain from the chain ring teeth may be determined by the relative positioning of these parts. In many embodiments, the tooth planar separation may be greater than the link planar separation. In many embodiments, the tooth distance may be greater than the link distance. In many embodiments, both will be true. Because the tooth shape may vary, it may be more meaningful in some embodiments to measure a tooth planar separation, and in other embodiments, it may be more meaningful to measure a tooth distance. For example, if the outer face 770 of one tooth is not parallel to the outer face 780 of another tooth, it may be difficult or impossible to judge a planar separation. In other embodiments, where there may be multiple discrete points that form an outer face of a tooth, rather than a planar surface, selecting a centerpoint may be complicated or impossible. In some embodiments with a single contact point between an outer tooth face and an inner surface of a chain link, that point may be considered the centerpoint. In some embodiments with multiple discrete points of contact between an outer tooth face and an inner surface of a chain link, the most central point may be considered to be the centerpoint. In many embodiments, however, the teeth and links may have a regular, symmetrical shape where either measurement can be made and evaluated to determine the amount of lateral pressure that will be created between the chain ring and the drive chain.

It will be apparent to a person having ordinary skill in the art that the measurements noted in the specification and claims may be complicated to accurately measure. Manufacturing tolerances, wear, and the like may cause variation in the size, shape, thickness, and position of the chain ring teeth and various parts of any given drive chain. Accordingly, measurements may be taken at varying points along a chain ring and/or drive chain. In some embodiments, an average actual relative measurement may be used. In other embodiments, a dimension as designed may be considered. In addition, a variety of drive chains could be used with the chain ring disclosed in the present disclosure. In many embodiments, the drive chain may be selected to have the size and spacing characteristics relative to the chain ring dimensions. In many embodiments, drive chains that are commonly used with 9, 10, and 11 speed bicycles are appropriate for use in the disclosed design.

While certain preferred embodiments of the present invention have been disclosed in detail, it is to be understood that various modifications may be adopted without departing from the spirit of the invention or scope of the following claims.

The invention claimed is:

1. A ring for driving a drive chain for a bicycle, comprising:
    a plurality of teeth that are connected to one another and serially arranged;
        wherein each of the plurality of teeth has a lateral thickness and the lateral thickness of each of the plurality of teeth at its respective thickest point at or above a respective base of the each of the plurality of teeth is substantially identical;
        wherein a first subset of the plurality of teeth is configured to have a first cross-sectional shape at a respective base; and
        wherein a second subset of the plurality of teeth is configured to have a second cross-sectional shape at a respective base that is different from the first cross-sectional shape.

2. The ring for driving a drive chain for a bicycle according to claim 1, wherein the first cross-sectional shape is rectangular.

3. The ring for driving a drive chain of a bicycle according to claim 1, wherein the second cross-sectional shape is non-rectangular.

4. The ring for driving a drive chain for a bicycle according to claim 1, wherein each of the teeth in the first subset of teeth is configured to fit within an inner link of the bicycle drive chain.

5. The ring for driving a drive chain for a bicycle according to claim 1, wherein each of the teeth in the first subset of teeth is configured to apply lateral pressure in a first direction to a respective link of the bicycle drive chain.

6. The ring for driving a drive chain for a bicycle according to claim 5, wherein each of the teeth in the first subset of teeth is configured to apply lateral pressure in a first direction to a respective inner link of the bicycle drive chain.

7. The ring for driving a drive chain for a bicycle according to claim 1, wherein each of the teeth in the second subset of teeth is configured to fit within an outer link of a bicycle drive chain.

8. The ring for driving a drive chain for a bicycle according to claim 1, wherein each of the teeth in the second subset of teeth is configured to apply lateral pressure in a second direction to a respective link of a bicycle drive chain.

9. The ring for driving a drive chain for a bicycle according to claim 8, wherein each of the teeth in the second subset of teeth is configured to apply lateral pressure in a second direction to a respective outer link of a bicycle drive chain.

10. The ring for driving a drive chain for a bicycle according to claim 1, wherein each of the teeth in the first subset of teeth has a top surface that is offset from a centerline of the drive chain when the ring and drive chain are placed in operative position.

11. The ring for driving a drive chain for a bicycle according to claim 1, wherein each of the teeth in the first subset of teeth and each of the teeth in the second subset of teeth have top surfaces and the top surfaces are not symmetrically arranged along a centerline of the drive chain when the ring and the drive chain are placed in operative position.

12. The ring for driving a drive chain for a bicycle according to claim 1, wherein at least some of the plurality of teeth have at least one tapered face.

13. A drive system for a bicycle, comprising:
    a drive chain having a plurality of links;
        wherein a first link has a first inner surface at a first plane and an adjacent second link has a second inner surface at a second plane, wherein the second inner surface faces the first inner surface; and
        wherein a link planar separation may be measured as a shortest distance between the first plane and the second plane; and
    a chain ring configured to removably interconnect with the drive chain, the chain ring comprising a plurality of teeth joined to one another and serially arranged;
        wherein the plurality of teeth includes a first tooth and an adjacent second tooth;
        wherein each of the plurality of teeth has a lateral thickness and the lateral thickness of each of the plurality of teeth at its respective thickest point at or above a respective base of the each of the plurality of teeth is substantially identical;

wherein the first tooth has a first outer surface at a third plane capable of contacting the first inner surface and the second tooth has a second outer surface at a fourth plane capable of contacting the second inner surface;

wherein a tooth planar separation may be measured as a shortest distance between the third plane and the fourth plane; and wherein the tooth planar separation is at least as great as the link planar separation.

14. The drive system for a bicycle according to claim 13, wherein the first tooth has a first cross sectional shape and the second tooth has a second cross sectional shape.

15. The drive system for a bicycle according to claim 13, wherein the first link is an inner link and the second link is an outer link.

16. The drive system for a bicycle according to claim 13, wherein the first tooth is configured to apply lateral pressure in a first direction to the first link.

17. The drive system for a bicycle according to claim 13, wherein the second tooth is configured to apply lateral pressure in a second direction to the second link.

18. The drive system for a bicycle according to claim 13, wherein the first tooth has a top surface that is offset from a centerline of the drive chain.

19. The drive system for a bicycle according to claim 13, wherein the first tooth and the second tooth each have a top surface and the top surfaces are not symmetrically arranged along a centerline of the drive chain.

20. A drivetrain for a vehicle, comprising:
a chain having a centerline; and
a chain ring comprising a plurality of teeth joined to one another and serially arranged;
wherein the chain ring may be configured to removably interfit with the chain;
wherein a first subset of the plurality of teeth is configured to have a first cross-sectional shape at a respective base;
wherein a second subset of the plurality of teeth is configured to have a second cross-sectional shape at a respective base that is different from the first cross-sectional shape;
wherein an average tooth position of the plurality of teeth is offset from the chain centerline when in operative position; and
wherein each of the plurality of teeth has a lateral thickness and the lateral thickness of each of the plurality of teeth at its respective thickest point at or above a respective base of the each of the plurality of teeth is substantially identical.

21. The drivetrain for a vehicle according to claim 20, wherein each top surface of each of the plurality of teeth is offset from the chain centerline when in operative position.

22. The drivetrain for a vehicle according to claim 20, wherein the plurality of teeth are arranged asymmetrically about the chain centerline when in operative position.

23. The drivetrain for a vehicle according to claim 20, wherein at least a first tooth of the plurality of teeth is configured to apply a first lateral force to the chain.

24. The drivetrain for a vehicle according to claim 23, wherein at least a second tooth of the plurality of teeth is configured to apply a second lateral force to the chain.

25. The drivetrain for a vehicle according to claim 24, wherein the first lateral force and the second lateral force are applied in substantially opposite directions.

* * * * *